(12) United States Patent
Schulte et al.

(10) Patent No.: US 12,456,868 B2
(45) Date of Patent: Oct. 28, 2025

(54) METHOD FOR OPERATING AN ENERGY SYSTEM, AND ENERGY SYSTEM

(71) Applicant: Siemens Aktiengesellschaft, Munich (DE)

(72) Inventors: Sascha Schulte, Höchstadt (DE); Alexander Polleti, Nabburg (DE); Christian Stahl, Uttenreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 420 days.

(21) Appl. No.: 18/247,334

(22) PCT Filed: Sep. 30, 2021

(86) PCT No.: PCT/EP2021/076912
§ 371 (c)(1),
(2) Date: Mar. 30, 2023

(87) PCT Pub. No.: WO2022/069614
PCT Pub. Date: Apr. 7, 2022

(65) Prior Publication Data
US 2023/0387694 A1 Nov. 30, 2023

(30) Foreign Application Priority Data

Oct. 2, 2020 (DE) ..................... 10 2020 212 497.3

(51) Int. Cl.
*H02J 3/46* (2006.01)
*G05B 15/02* (2006.01)
(Continued)

(52) U.S. Cl.
CPC ................ *H02J 3/46* (2013.01); *G05B 15/02* (2013.01); *G05B 19/042* (2013.01); *H02J 3/32* (2013.01); *H02J 2203/10* (2020.01)

(58) Field of Classification Search
None
See application file for complete search history.

(56) References Cited

U.S. PATENT DOCUMENTS

| 5,734,255 | A | * | 3/1998 | Thompson | ................ | H02J 3/38 |
| | | | | | | 290/2 |
| 5,754,033 | A | * | 5/1998 | Thomson | .................. | H02J 3/38 |
| | | | | | | 702/182 |

(Continued)

FOREIGN PATENT DOCUMENTS

| CA | 2908384 C | * | 8/2019 | ............. | H02J 3/381 |
| CN | 109687485 A | * | 4/2019 | ............. | H02J 15/00 |

(Continued)

OTHER PUBLICATIONS

Kar et al., "Distributed State Estimation and Energy Management in Smart Grids: A Consensus + Innovations Approach", Aug. 2014, IEEE Journal of Selected Topics in Signal Processing, vol. 8, No. 6, Dec. 2014. (Year: 2014).*

(Continued)

*Primary Examiner* — Mohammad Ali
*Assistant Examiner* — Kelvin Booker
(74) *Attorney, Agent, or Firm* — Slayden Grubert Beard PLLC

(57) ABSTRACT

Various embodiments of the teachings herein include methods and/or systems for operating a power system having a central control unit and two power system components. The method may include: determining a self-estimated value for each power system component based on a respective state value; providing the central control unit with a present maximum amount of power for each of the components; receiving a request for a demanded electrical power; ascertaining a distribution variable relating to the demanded power for each component based on the self-estimated values and the maximum amount of power output; and (Continued)

distributing a demanded electrical power to the power system components. The power system components comprise an energy generator unit, an energy consumer unit, or an energy storage unit.

13 Claims, 4 Drawing Sheets

(51) Int. Cl.
*G05B 19/04* (2006.01)
*G05B 19/042* (2006.01)
*H02J 3/32* (2006.01)

(56) References Cited

U.S. PATENT DOCUMENTS

| | | | | |
|---|---|---|---|---|
| 8,554,383 | B2* | 10/2013 | Toba | H02J 3/46 700/297 |
| 8,930,038 | B2* | 1/2015 | Forbes, Jr. | H02J 3/00 700/297 |
| 9,008,852 | B2* | 4/2015 | Forbes, Jr. | H02J 13/00006 700/286 |
| 9,465,397 | B2* | 10/2016 | Forbes, Jr. | H02J 3/00 |
| 9,513,648 | B2* | 12/2016 | Forbes, Jr. | G05F 1/66 |
| 9,595,832 | B2 | 3/2017 | Delon et al. | |
| 9,806,563 | B2* | 10/2017 | Forbes, Jr. | H02J 3/14 |
| 10,079,696 | B2 | 9/2018 | Thiel et al. | |
| 10,320,227 | B2* | 6/2019 | Forbes, Jr. | G05B 13/02 |
| 10,523,050 | B2* | 12/2019 | Forbes, Jr. | H02J 13/00006 |
| 2004/0263116 | A1* | 12/2004 | Doruk | F01K 13/00 320/107 |
| 2010/0094574 | A1* | 4/2010 | He | H02J 3/00 703/2 |
| 2014/0039699 | A1* | 2/2014 | Forbes, Jr. | G05B 13/02 700/286 |
| 2014/0039701 | A1* | 2/2014 | Forbes, Jr. | G05B 19/042 700/286 |
| 2014/0277786 | A1* | 9/2014 | Forbes, Jr. | H02J 13/00006 700/286 |
| 2015/0127178 | A1* | 5/2015 | Forbes, Jr. | G05B 19/02 700/286 |
| 2017/0025893 | A1* | 1/2017 | Forbes, Jr. | G05B 15/02 |
| 2017/0077751 | A1* | 3/2017 | Forbes, Jr. | H02J 13/00026 |
| 2017/0338693 | A1* | 11/2017 | Forbes, Jr. | G05B 13/0255 |
| 2018/0041051 | A1* | 2/2018 | Rush | H02J 3/381 |
| 2018/0090987 | A1 | 3/2018 | Hashimoto | |
| 2018/0123390 | A1* | 5/2018 | Forbes, Jr. | G05B 19/02 |
| 2018/0358812 | A1* | 12/2018 | Anderson | H02J 3/381 |
| 2019/0074693 | A1 | 3/2019 | Kudo | |
| 2020/0153274 | A1* | 5/2020 | Münz | H02J 13/00007 |

FOREIGN PATENT DOCUMENTS

| | | | |
|---|---|---|---|
| DE | 102013108879 A1 | 2/2015 | |
| EP | 2214283 B1 * | 6/2019 | ........ H02J 13/00006 |
| KR | 20200069159 A * | 6/2020 | ............... H02J 3/32 |
| WO | WO-2008072762 A1 * | 6/2008 | ............. B60L 58/22 |
| WO | 2015/071202 A1 | 5/2015 | |

OTHER PUBLICATIONS

Mathieu et al., "State Estimation and Control of Electric Loads to Manage Real-Time Energy Imbalance", Nov. 2011, IEEE Transactions on Power Systems, vol. 28, No. 1, Feb. 2013. (Year: 2011).*
Niknam et al., "A practical algorithm for distribution state estimation including renewable energy sources", Sep. 2008, Renewable Energy 34 (2009) 2309-2316. (Year: 2008).*
Search Report for International Application No. PCT/EP2021/076912, 11 pages.
WO 2015/071202 A1, U.S. Pat. No. 10,079,696 B2.

\* cited by examiner

METHOD FOR OPERATING AN ENERGY SYSTEM, AND ENERGY SYSTEM

CROSS-REFERENCE TO RELATED APPLICATIONS

This application is a U.S. National Stage Application of International Application No. PCT/EP2021/076912 filed Sep. 30, 2021, which designates the United States of America, and claims priority to DE Application No. 10 2020 212 497.3 filed Oct. 2, 2020, the contents of which are hereby incorporated by reference in their entirety.

TECHNICAL FIELD

The present disclosure relates to energy systems. Various embodiments of the teachings herein include systems and/or methods for operating a power system having at least two power system components.

BACKGROUND

In a power supply system, various types of energy generators, energy consumers and energy stores are electrically connected to one another. Due to the decentralization of the power supply, the range of components arranged in a power supply system is growing further still. Energy generators used at present are in particular power plants, diesel units, but also photovoltaic installations and wind turbines. Energy can also be stored in different ways, in particular in battery stores or by means of chemical conversion, in particular electrolysis.

The size of different power supply systems can also differ greatly:

A power supply system can cover the electrical components of a building. It can likewise cover cities or individual city districts.

An amount of power or energy requested in a power supply system is at present distributed in a controlled manner by means of load balancing in such a way that power peaks are avoided and individual components are not over- or under-loaded. At present, the control is typically carried out in a centralized manner. The control is carried out on the basis of numerical optimizations on the basis of a multiplicity of parameters of the electrical components. The disadvantage of such control based on numerical optimizations is that it is time-consuming to prepare, maintain and execute, expensive and susceptible to errors.

Integrating small decentralized components, some of which are operated with a high level of dynamic performance, into such numerical optimizations for centralized control requires, in particular when the topology is unknown, the knowledge of a person skilled in the art. Disadvantageously, this integration is difficult to automate. Integrating small dynamic decentralized components, in particular individual domestic stores or small photovoltaic installations of a private household, into a centrally controlled load balancing system in a power supply system is thus disadvantageously time-consuming and expensive.

SUMMARY

The teachings of the present disclosure include systems and/or methods for operating a power system and a power system which allow reliable, less complex and inexpensive control of heterogeneous decentralized power supply systems. For example, some embodiments of the teachings herein include a method for operating a power system (1) including: providing the power system (1) comprising a central control unit (6) and at least a first power system component (4) and a second power system component (5), each power system component (4, 5) having a control unit and being connected to the central control unit (6), ascertaining a first self-estimated value (SA1) of the first power system component (4) in the control unit thereof on the basis of at least a first state value (P1), ascertaining a second self-estimated value (SA2) of the second power system component (5) in the control unit thereof on the basis of at least a second state value (P2), providing the central control unit (6) with a present maximum amount of power of the first power system component (4) and of the second power system component (5), receiving a request for a demanded electrical power in the central control unit (6), ascertaining in the central control unit (6) a distribution variable (W) relating to the demanded power for each power system component (4, 5) on the basis of the self-estimated values (SA1, SA2) and the respective maximum amount of power output, and distributing a demanded electrical power to the power system components (4, 5), wherein the power system components used are an energy generator unit (7, 8), an energy consumer unit or an energy storage unit (4, 5), and the energy storage unit is a battery store.

In some embodiments, the self-estimated values for an energy output (SA1, SA2) are used separately from the self-estimated values for an energy draw in the ascertaining of the distribution variable (W) in the central control unit (6).

In some embodiments, the state values (P1, P2, P3, P4) are determined using predetermined state value functions (15, 35) which provide state values (P1, P2, P3, P4) according to a physical input variable (10, 30).

In some embodiments, a state of charge (10) and/or a storage temperature (30) and/or an ambient temperature are used as the input variable relating to an energy storage unit.

In some embodiments, at least two first state values (P1, P3) and/or at least two second state values (P2, P4) are ascertained and the first self-estimated value (SA1) is ascertained as the product of the respective two first state values (P1, P3) and the second self-estimated value (SA2) is ascertained as the product of the respective two second state values (P2, P4).

In some embodiments, the distribution variable (W) used is a weighting variable as the quotient of the self-estimated value (SA1, SA2, SA7, SA8) and the maximum power of a power system component (4, 5, 7, 8) in relation to the sum of all the self-estimated values (SA1, SA2, SA7, SA8) and the respective maximum power thereof.

In some embodiments, the power system component (4, 5) transmits its class and its maximum power to the central control unit (6).

In some embodiments, a system priority value (CA) of each power system component (4, 5, 7, 8) is ascertained, the system priority value (CA) being ascertained as a function of a state value (P5, P6) which describes the class of the power system component (4, 5, 7, 8).

In some embodiments, the system priority value (CA) is determined using predetermined state value functions (51, 52, 53) which provide state values (60) according to a physical input variable (50), a cost-dependent input variable and/or an emission-dependent input variable, in particular a carbon-dioxide-emission-dependent input variable.

In some embodiments, the system priority value (CA) is incorporated into the distribution variable (W).

As another example, some embodiments include a power system (1) for carrying out one or more of the methods described herein, wherein the power system (1) comprises at least one central control unit (6) and two power system components (4, 5, 7, 8), each power system component (4, 5, 7, 8) having a control unit and being connected to the central control unit (6).

In some embodiments, the power system component is a virtual power plant (9, 11) or a power subsystem.

In some embodiments, the power system component is a virtual battery.

In some embodiments, the central control unit (6) is locally assigned to a node of a power grid.

BRIEF DESCRIPTION OF THE DRAWINGS

Further features, properties, and advantages of various embodiments of the teachings of the present disclosure result from the description that follows with reference to the accompanying figures. In the figures, in each case schematically.

DETAILED DESCRIPTION

Figure 1:
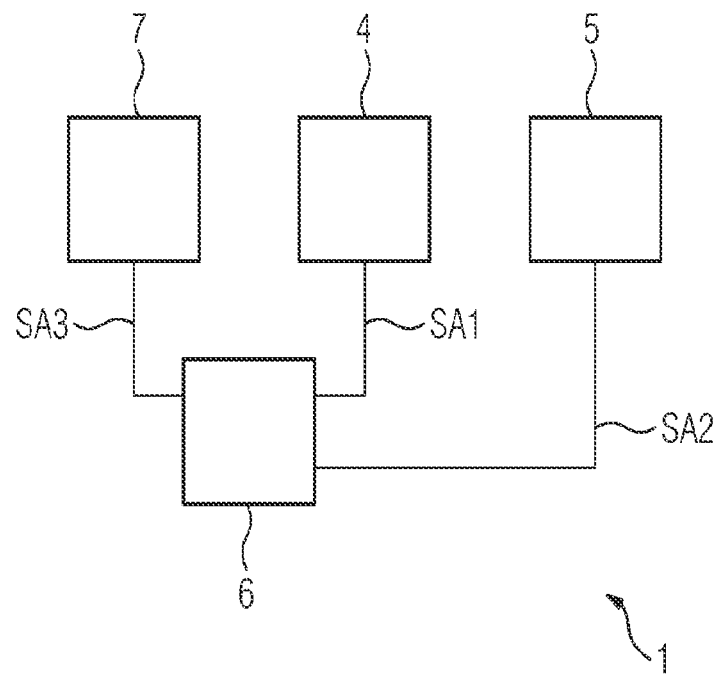
FIG. 1 shows a power system having two battery storage units, a diesel generator and a central control unit incorporating teachings of the present disclosure.

In some embodiments of the teachings herein, a power system comprises a central control unit and at least a first power system component and a second power system component. Each power system component has a control unit and is connected to the central control unit. A self-estimated value of a first power system component is ascertained in the control unit thereof on the basis of at least a first state value. Furthermore, a second self-estimated value of a second power system component is ascertained in the control unit thereof on the basis of at least a second state value. Furthermore, the central control unit is provided with a currently maximum possible amount of power of the first power system component and of the second power system component. Furthermore, a request for a demanded electrical power is received in the central control unit. Subsequently, a distribution variable relating to the demanded power is ascertained in the central control unit for each power system component on the basis of the self-estimated values and the respective maximum amount of power output. Subsequently, the demanded electrical power is distributed to the power system components according to the ascertained distribution variables.

A power system for carrying out the methods described herein comprises at least one central control unit and two power system components. Each power system component has a control unit. Furthermore, each power system component is connected to the central control unit.

A currently maximum possible amount of power means the maximum possible power based on the design and the component limits. This maximum possible power can also vary over time, depending in particular on aging processes. The maximum possible amount of power can thus change if the methods are repeated multiple times. This changed value is then understood to mean a currently maximum possible amount of power.

The self-estimated value of the respective power system component is ascertained on the basis of at least a first state value. Ascertaining the self-estimated value on the basis of the state value is comparable to determining membership values of predetermined membership functions in a fuzzy logic system. In particular, the power system is provided with predetermined state value functions on the basis of which the present state value is assigned to the power system component. A self-estimated value is then ascertained on the basis thereof. The self-estimated value of a power system component can also be ascertained on the basis of a plurality of state values.

The parameters necessary for a controlled distribution of electrical power are converted into a self-estimated value in individual power system components, which self-estimated value is transmitted to the central controller both in a type-agnostic and system-agnostic manner. In other words, the self-estimated value is transmitted to the central control unit irrespective of the type of the power system component and irrespective of the kind of system the power system is. Agnostic here means a method that can distribute a requested amount of energy to a plurality of power system components in an optimum manner even without knowing the underlying details of the associated power system, in particular of the associated power system components of the power system.

The self-estimated value is ascertained at local level, that is to say in each power system component.

The requested electrical power can be understood to mean a power output or power draw.

Any number of power system components of different kinds of system and of different types can thereby be involved in the distribution of the electrical power in the central control unit. This load balancing can be carried out automatically, that is to say without human intervention. The load balancing can furthermore be adapted to suit new topologies, without having to intervene in the central control. This makes it possible to broaden the power system components involved for the distribution automatically, that is to say without the intervention of a person skilled in the art. Complex system modeling comprising a numerical optimization or manual adaptation of individual parameters of individual power system components is not necessary.

In some embodiments, the power system components used are an energy generator unit, an energy consumer unit or an energy storage unit. In some embodiments, the energy storage unit is a battery store. In other words, the power system is set up heterogeneously and locally and comprises a wide variety of power system components. A self-estimated value is ascertained for each of the power system components irrespective of their kind and is used in the distribution of the requested electrical power. The distribution thus takes place irrespective of how exactly the power system is configured in terms of the power system components.

In some embodiments, the self-estimated values for an energy output are used separately from the self-estimated values for an energy draw in the ascertaining of the distribution variable in the central control unit. A self-estimated value is thus furthermore ascertained by each power system component. This self-estimated value is transmitted to the central control unit. To ascertain the distribution variable, the central control unit detects whether this self-estimated value is for energy draw or energy output. It is included in the distribution variable in particular by using opposite arithmetic signs for the energy draw and energy output when ascertaining the distribution variable. Energy storage units can thus be involved in the automated ascertaining of the distribution variable without human intervention being necessary, depending on whether they are being charged or discharged.

In some embodiments, the state values are determined using predetermined state functions. The state value functions in particular provide state values according to a physical input variable. However, it is likewise possible for the state functions to provide state values according to non-physical input variables. Costs, in particular operating costs, can also in particular be used as input variables. A physical input variable is in particular a storage temperature and/or a state of charge of an energy storage unit or an ambient temperature of a power system component.

It is thus possible for each power system component itself to ascertain a self-estimated value by assigning the state value to a state function, it being possible for the state function to be dependent on physical input variables or non-physical input variables.

In some embodiments, at least two first state values and/or at least two second state values are ascertained. In particular, one state value can be based on a non-physical input variable and another state variable can be based on a physical input variable. The first self-estimated value is ascertained as the product of the respective at least two first state values for the first power system component. For the second power system component, the second self-estimated value is ascertained as the product of the respective at least two second state values.

In some embodiments, the distribution variable used is a ratio of the self-estimated value and the maximum power of a power system component to the sum of all the self-estimated values and the respective maximum power thereof. In other words, a power system component is assessed on the basis of its self-estimated value and the maximum power in relation to the total self-estimated value and the maximum power of the system. This action is illustrated by means of Equation 1. Therein, the distribution variable w relating to the first power system component ES1 is shown as a function of the first self-estimated value $SA_{ES1}$ and the maximum power of the first power system component $P_{max,ES1}$.

To calculate the distribution variable w, self-estimated values SA are determined for all n power system components. Furthermore, the maximum power for all n power systems is used jointly in the calculation of the distribution variable.

$$w_{ES1} = \frac{SA_{ES1} \times P_{max,ES1}}{\sum_{ESn=1}^{ESk}(SA_n \times P_{max,n})} \qquad \text{Equation 1}$$

The distribution variable may be calculated using the weighting according to Equation 1. Compared to a numerical simulation, as used for central control in the prior art, this calculation is less complex. The calculation can be carried out for each power system component in the central control unit using low computing capacity.

In some embodiments, the class of the power system component and its maximum power are transmitted to the central control unit. Typically, each power system component transmits its class to the central control unit. If one of the power system components does not transmit its class to the central control unit, fixed values are assigned in order to nevertheless allow assessment of the power system.

In some embodiments, a system priority value of each power system component is ascertained, the system priority value being ascertained as a function of a state value which describes the class of the power system component and the maximum power of the power system component. In particular, this can be an assessment of a diesel unit or an assessment of a photovoltaic installation as the class. It is thus possible for the class of the power system component to be involved in the ascertaining of the distribution variable in a simple manner. In particular, regenerative energy generating units with a higher system priority value can be assessed.

In some embodiments, the system priority value is determined using predetermined state value functions which provide state values according to a physical input variable, a cost-dependent input variable and/or an emission-dependent input variable. An emission-dependent input variable is in particular a carbon-dioxide-emission-dependent input variable. Furthermore, as one input variable, a value for a security of supply can be used in the state value function for the system priority value. The class of the respective power system component can thus be assessed with regard to a wide variety of aspects. It is sufficient for this assessment to take place only once by creating the predetermined state value functions.

In some embodiments, the system priority value is incorporated into the distribution variable, in particular by means of a product. Equation 2 shows one possible way of calculating the distribution variable w' according to the system priority value CA of the first power system component, the self-estimated values SA and the maximum powers $P_{max}$ of the power system components.

$$w'_{ES1} = \frac{CA_{ES1} \times SA_{ES1} \times P_{max,ES1}}{\sum_{ESn=1}^{ESk}(CA_{ES1} \times SA_n \times P_{max,n})} \qquad \text{Equation 2}$$

Including the system priority value in the distribution variable allows complex power systems to be operated by way of a simple calculation, in particular as shown in Equation 2, in such a way that all the power system components are taken into account together for the distribution of a requested power, irrespective of their class and size.

In some embodiments, the power system component is a virtual power plant or a power subsystem. A virtual power plant is understood to mean a combination of various power system components, such as in particular a diesel unit, a photovoltaic installation and/or a battery store, which are controlled by a control unit which does not reveal the individual power system components to the outside. In other words, a virtual power plant, irrespective of the individual power system components, is presented to the outside, that is to say to the central control unit, as a single power system component. In particular, the virtual power plant thus comprises its own control unit, which communicates with the central control unit of the power system. A power subsystem, which in turn comprises various power system components, is also presented to the outside, that is to say to the central control unit of the power system, as precisely one power system component.

In total, at least one self-estimated value and/or one system priority value are thus ascertained for the virtual power plant and/or the power subsystem. It is then possible to integrate the virtual power plant or the power subsystem into the power system as precisely one power system component. It is then also possible to assign a predetermined class, in particular a diesel generator or a battery store, to the virtual power plant or to the power subsystem. The virtual power plant or the power subsystem is thus produced in a simple manner, which simplifies the integrating of the virtual power plant or of the power subsystem into the power system to distribute a requested power and requires a low processor power in the central control unit.

In some embodiments, the power system component is a virtual battery store. A virtual battery here means a computer comprising a processor which requests amounts of energy, in particular in accordance with contractual energy quotas, by presenting itself to the central control unit as an empty battery store which still has charging capacity. In particular, an amount of energy that is transferred from an energy supplier to a customer contractually can be included in the power system as a full virtual battery store. The virtual battery store of the customer is initially presented to the outside as empty by means of a first assigned value. After the contractually stipulated amount of energy has been transferred, the virtual battery store is presented to the central control unit as full, that is to say charged. Typically, a virtual battery store is directly connected to a further power system component, in particular to a virtual power plant. The transfer of a defined amount of energy to the virtual power plant is thus monitored by means of the virtual battery store.

The use of virtual power plants, of power subsystems and of virtual battery stores as power system components advantageously makes it possible to operate cascaded power supply systems, in which in particular virtual power plants are built in a mixed group using physical power system components, optimally and reliably given low computing capacity. The distribution of requested electrical power to physically changing power systems can be adapted quickly and simply by means of virtual power plants and virtual battery stores. In particular in a closed environment, in particular in an industrial complex, it is thus possible to prevent a building control system or factory control system from controlling complex distributions of the electrical energy within the closed environment. Rather, the entire closed environment is presented to the central control unit in particular as a virtual battery.

In some embodiments, the central control unit is locally assigned to a node of a power grid. The infrastructure of the power system can thus be used in order to integrate the central control unit into the power system.

FIG. 1 shows a power system 1 having a plurality of power system components incorporating teachings of the present disclosure. The power system components used are a first battery storage unit 4, a second battery storage unit 5 and a diesel generator 7. The first battery storage unit 4 constitutes a domestic store with a size of kWh. The second battery storage unit 5 is a large battery store with a size of 100 kWh. The maximum power of the domestic store 4 is 3 kW. The maximum power of the large battery store is 50 kW. The maximum power of the diesel generator 7 is likewise 50 kW.

Each power system component comprises its own control unit. The power system components are all directly connected to a central control unit 6. A request for a demanded electrical power is transmitted to the central control unit 6. The central control unit 6 furthermore receives self-estimated values of the power system components and system priority values and, on the basis thereof, a distribution variable for distributing the requested electrical power is ascertained. Subsequently, the requested electrical power, in this example 15 kW, is distributed to the diesel generator 7, the first battery storage unit 4 and the second battery storage unit 5.

Figure 2:
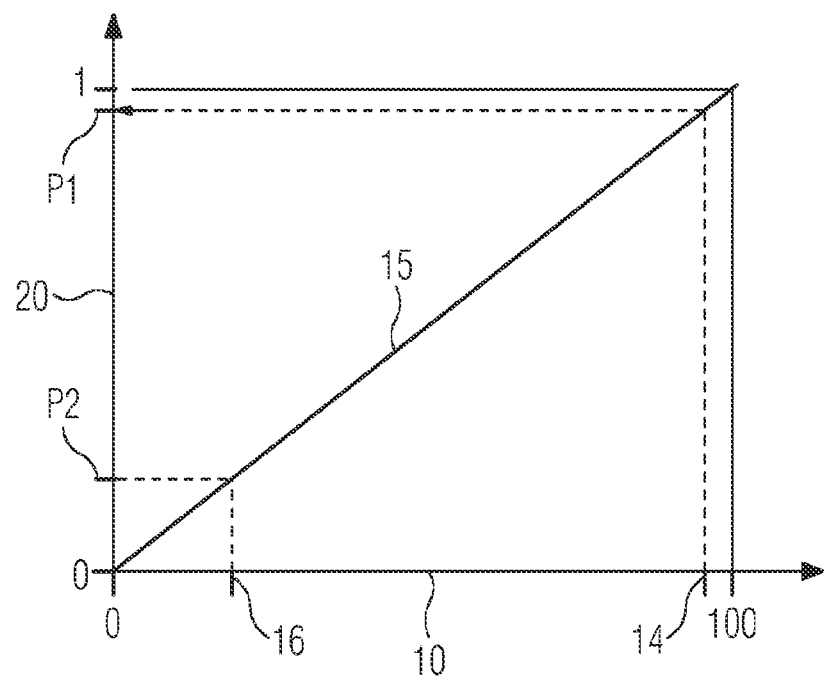
FIG. 2 shows a state-of-charge value function of a battery storage unit incorporating teachings of the present disclosure.
Figure 3:
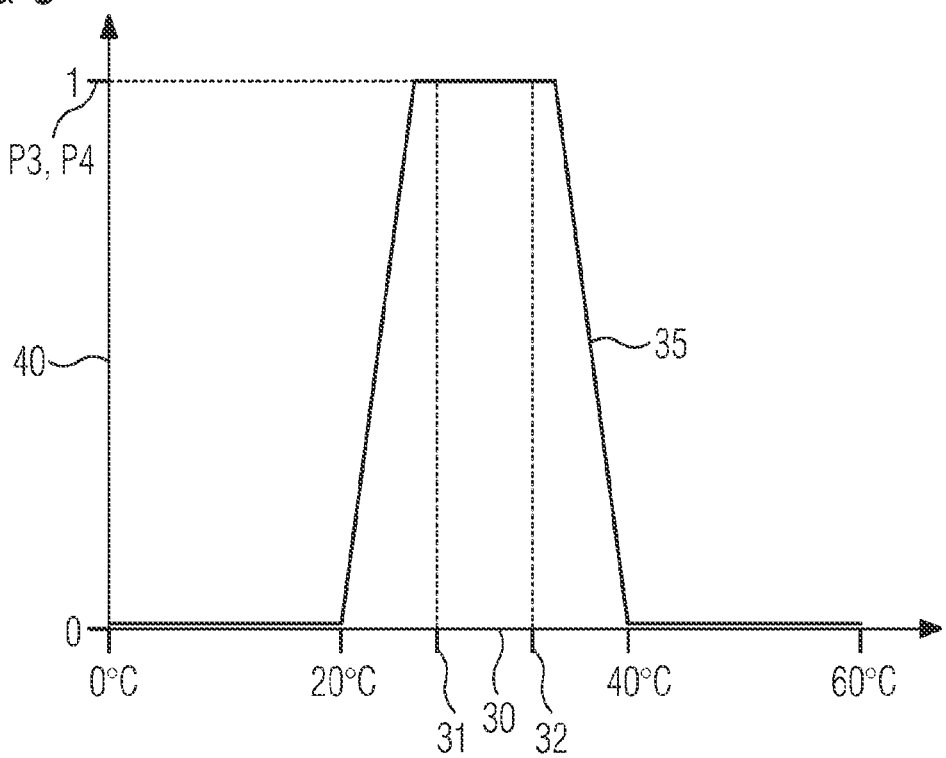
FIG. 3 shows a temperature state value function of a battery storage unit incorporating teachings of the present disclosure.

FIGS. 2 and 3 illustrate how a self-estimated value SA is ascertained for each control unit of the power system components. Initially, state values are ascertained on the basis of physical and non-physical parameters. FIG. 2 illustrates the ascertaining of a state-of-charge state value 20 on the basis of a state of charge of the battery storage unit 4, 5. The first state of charge of the first battery storage unit 4 is 95%. A first state-of-charge value P1 of the first battery storage unit 4 can be determined by means of the first state value functions. The state-of-charge value for a state of charge of 95% is 0.95. The second state of charge of the second battery storage unit 5 is 17%. The second state-of-charge state value P2 of the second battery storage unit 5 is thus 0.17.

Furthermore, a further state value is ascertained for each battery storage unit. FIG. 3 illustrates a corresponding state value function: The state value function 35 describes a temperature corridor in which the battery storage unit is operated optimally. A temperature state value 40 is determined as a function of the temperature of the battery storage unit 30 by means of the second state value functions 35. In this example, an optimal temperature range for operating the battery storage unit lies in a range from ° C. to 40° C. A first temperature state value P3 is ascertained for the first battery storage unit 4. The temperature of the first battery storage unit 4 is 33° C. This results in a first temperature state value P3 of 1. A second temperature state value P4 is ascertained for the second battery storage unit 5. The temperature of the second battery storage unit 5 is 38° C. A value of 1 is thus ascertained as the second temperature state value P4. A product of the state values assigned to a power system component is now used to determine a first self-estimated value SA1 and a second self-estimated value SA2 for the first battery storage unit 4 and the second battery storage unit 5:

$$SA1 = 0.95 \times 1 = 0.95 \quad \text{Equation 3}$$

$$SA2 = 0.17 \times 1 = 0.17 \quad \text{Equation 4}$$

The self-estimated value of the diesel generator SA3 is 1.

Figure 4:
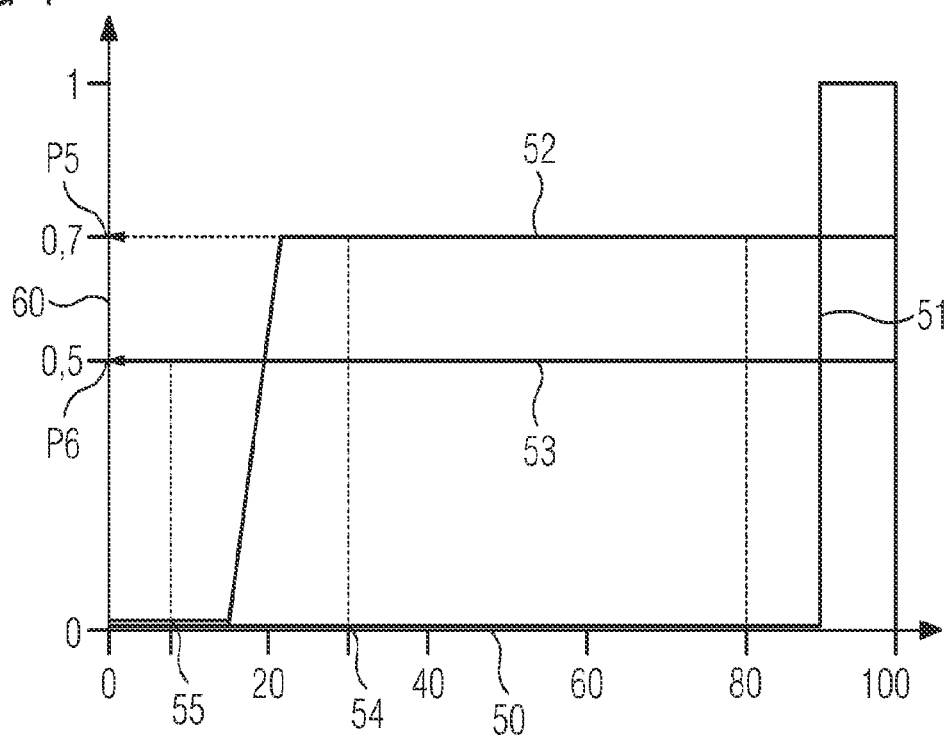
FIG. 4 shows a relative power requirement state value function of a battery storage unit incorporating teachings of the present disclosure.

Furthermore, a first system priority value CA1 and a second system priority value CA2 are respectively ascertained for the first battery storage unit 4 and the second battery storage unit 5. FIG. 4 illustrates the state value functions which are used for determining the system priority values in this example. A relative power requirement for the power system component is plotted on the x-axis. Relative power requirement is understood to mean the ratio of the requested electrical power to the maximum providable electrical power of the respective power system component. A power requirement state value 60 is plotted on the y-axis. FIG. 4 now shows state value functions for a diesel generator 51, for a domestic store 52 and for a large battery store 53. The first battery storage unit 4 is operated with a relative first power requirement 54 of 30%. The first battery storage unit 4 is a domestic store. A first relative power requirement state value P5 of 0.7 is obtained. The second battery storage unit 5 is operated with a second relative power requirement 55 of 5%. The second battery storage unit 5 acts as a large battery store. A second power requirement state value P6 is thus 0.5. The diesel generator 7 is operated with a third relative power requirement 56 of 10%. A third power requirement state value P7 of 0 is thus obtained. In this example, no further state value functions are used for determining the system priority value CA. The following are thus obtained:

CA1=0.7

CA2=0.5

CA3=0

The distribution variable is then determined using Equation 2 as follows:

$$w'_1 = \frac{0.95 \times 0.7 \times 3 \text{ kW}}{0.95 \times 0.7 \times 3 \text{ kW} + 0.17 \times 0.5 \times 50 \text{ kW} + 0 \times 50 \text{ kW}} = 0.32 \quad \text{Equation 5}$$

$$w'_2 = \frac{0.17 \times 0.5 \times 50 \text{ kW}}{0.95 \times 0.7 \times 3 \text{ kW} + 0.17 \times 0.5 \times 50 \text{ kW} + 0 \times 50 \text{ kW}} = 0.68 \quad \text{Equation 6}$$

$$w'_3 = \frac{0 \times 50 \text{ kW}}{0.95 \times 0.7 \times 3 \text{ kW} + 0.17 \times 0.5 \times 50 \text{ kW} + 0 \times 50 \text{ kW}} = 0 \quad \text{Equation 7}$$

0.32 is ascertained as the distribution variable for the first battery storage unit 4. 0.68 is ascertained as the distribution variable for the second battery storage unit 5. 0 is ascertained as the distribution variable for the diesel generator 7. The requested electrical power of 15 kW is thus distributed in such a way that 4.8 kW are taken from the first battery storage unit 4 and 10.2 kW are taken from the second battery storage unit 5.

Figure 5:
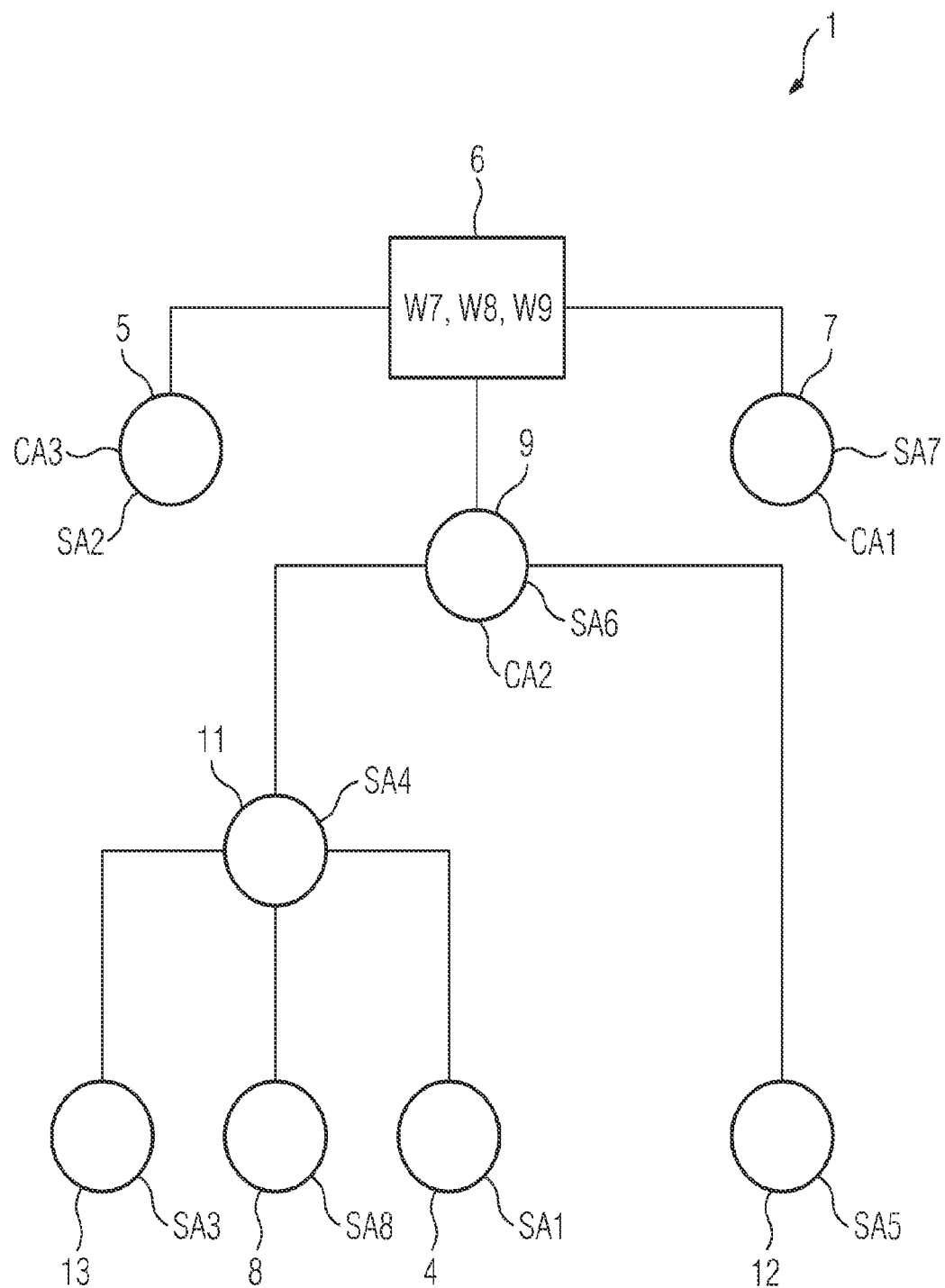
FIG. 5 shows a power system having a large battery store, virtual power plants and a diesel generator incorporating teachings of the present disclosure.

FIG. 5 shows a branched power system 1 having a plurality of diesel generators, virtual power plants and battery storage units. With reference to FIG. 5 it should be explained that the distribution of a requested electrical power is clearly simplified by virtue of the self-estimated values and system priority values being assigned. The power system 1 comprises a central control unit 6. The central control unit 6 is directly connected to a second battery storage unit 5, that is to say to a large battery store, to a diesel generator 7 and to a first virtual power plant 9. The first virtual power plant 9 in turn comprises a second large battery store 12 and a second virtual power plant 11. The second virtual power plant 11 in turn comprises a first battery storage unit 4, that is to say a domestic store, a photovoltaic installation 8 and a third battery storage unit 13.

Each power system component ascertains a self-estimated value. The first self-estimated value SA1 of the first battery store 4, the eighth self-estimated value SA8 of the photovoltaic installation 8 and the third self-estimated value SA3 of the third battery storage unit 13 are transferred to the virtual power plant 11 and multiplied together there and initially stored as a fourth self-estimated value S4. The fourth self-estimated value S4 and the fifth self-estimated value S5 of the second battery store 12 are transferred to the first virtual power plant 9. In the first virtual power plant 9, which comprises a processor, a sixth self-estimated value SA6 is in turn ascertained by means of a multiplication. A seventh self-estimated value SA7 of the diesel generator 7 and a second self-estimated value SA2 of the second battery storage unit 5 are likewise ascertained. The second self-estimated value SA2, the sixth self-estimated value SA6 and the seventh self-estimated value SA7 are transmitted to the central control unit 6. Furthermore, system priority values CA1, CA2 and CA3 are ascertained for the diesel generator 7, the virtual power plant 9 and the second battery storage unit 5, respectively, and transferred to the central control unit.

In the central control unit 6, a distribution variable is ascertained for the second battery storage unit 5, the diesel generator 7 and the first virtual power plant 9. A requested power is subsequently distributed to these three power system components according to this distribution variable. The method for distributing the energy on the basis of self-estimated values and system priority values can then in turn be carried out within the virtual power plant 9 on this level, in other words recursively. In this case, the amount of energy ascertained for the superordinate distribution is used as the requested power.

Figure 6:
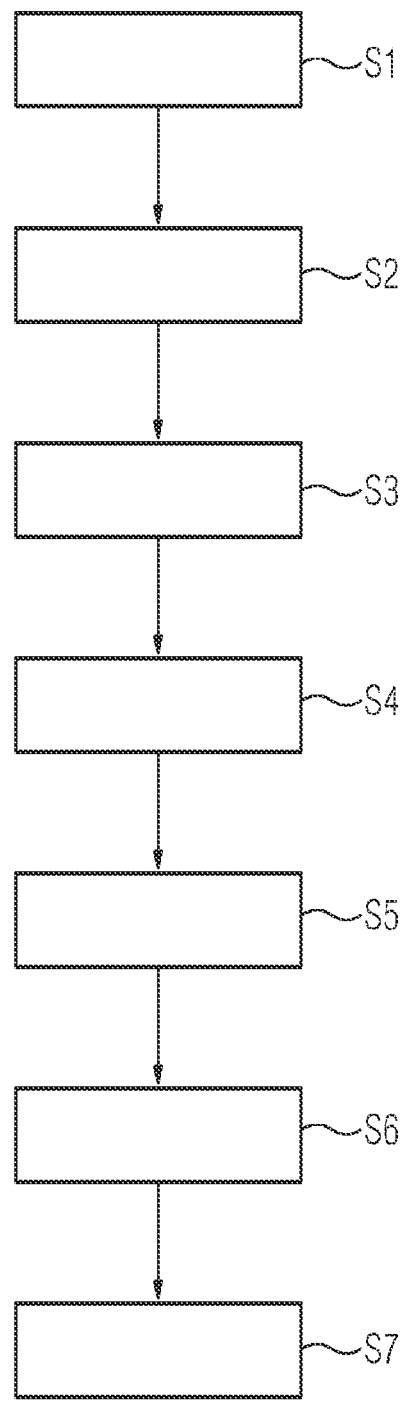
FIG. 6 shows a process diagram for operating a power system.

FIG. 6 illustrates an example method for distributing a requested power to a power system 1 having a plurality of power system components. In a first step S1, a power system having a plurality of power system components is provided. In a second step S2, a first self-estimated value of a first power system component is ascertained. In a third step S3, a second self-estimated value of a second power system component is ascertained. The first and the second step can take place one after another or at the same time. In a fourth step S4, a present maximum amount of power of the power system component is provided. What is meant by present here is that, in the case of a storage unit, the maximum possible power output at the time of operation is provided. The maximum possible power output can deteriorate over time, as a result of which this value should be adapted. In a fifth step S5, a request for an electrical power is received in a central control unit. Ascertaining the self-estimated values and receiving the requested electrical power can in turn take place at successive times or at the same time. In a sixth step S6, a distribution variable is ascertained for each power system component. Subsequently, in a seventh step S7, the requested electrical power is distributed to the power system components according to the distribution variable.

LIST OF REFERENCE SYMBOLS 1 power system
4 first battery storage unit
5 second battery storage unit
6 central control unit
7 diesel generator
8 photovoltaic installation
9 first virtual power plant
10 state of charge of the battery store
11 second virtual power plant
12 second large battery store
13 third battery storage unit
14 first state of charge of the first battery storage unit
15 first state value function
16 second state of charge of the second battery storage unit
20 state-of-charge state value
30 temperature of the battery store
31 temperature of the first battery storage unit
32 temperature of the second battery storage unit
35 second state value function 40 temperature state value
50 relative power requirement
51 third state value function of a diesel generator
52 fourth state value function of a domestic store
53 fifth state value function of a large battery store
54 relative power requirement for the first battery storage unit
55 relative power requirement for the second battery storage unit
60 power requirement state value
P1 first state-of-charge value
P2 second state-of-charge value
P3 first temperature state value
P4 second temperature state value
P5 first power requirement state value
P6 second power requirement state value
P7 third power requirement state value
SA1 first self-estimated value
SA2 second self-estimated value
SA3 third self-estimated value
SA4 fourth self-estimated value
SA5 fifth self-estimated value
SA6 sixth self-estimated value
SA7 seventh self-estimated value
SA8 eighth self-estimated value
CA1 first system priority value
CA2 second system priority value
CA3 third system priority value
W7 distribution variable relating to the diesel generator
W8 distribution variable relating to the first large battery store
W9 distribution variable relating to the first virtual power plant
S1 providing the power system
S2 ascertaining a first self-estimated value
S3 ascertaining a second self-estimated value
S4 providing a present maximum amount of power
S5 receiving a request
S6 ascertaining a distribution variable
S7 distributing a requested electrical power

What is claimed is:

1. A method for operating a power system having a central control unit and a first power system component and a second power system component, the method comprising:
determining a first self-estimated value of the first power system component in an associated control unit based on a first state value;
ascertaining a second self-estimated value of the second power system component in an associated control unit based on a second state value,
wherein each power system component includes a control unit connected to the central control unit;
providing the central control unit with a present maximum amount of power for each of the first power system component and the second power system component;
receiving a request for a demanded electrical power in the central control unit;
ascertaining in the central control unit a distribution variable relating to the demanded power for each power system component based on the respective self-estimated values and the respective maximum amount of power output,
wherein the distribution variable comprises a weighting variable as the quotient of the self-estimated value and the maximum power of a power system component in relation to the sum of all the self-estimated values and the respective maximum power thereof; and
distributing a demanded electrical power to the power system components,
wherein the power system components comprise an energy generator unit, an energy consumer unit, or an energy storage unit.

2. The method as claimed in claim 1, wherein the self-estimated values for an energy output are separately from the self-estimated values for an energy draw in ascertaining the distribution variable in the central control unit.

3. The method as claimed in claim 1, wherein determining the state values includes using predetermined state value functions providing state values according to a physical input variable.

4. The method as claimed in claim 3, wherein the input variable comprises a state of charge, a storage temperature, and/or an ambient temperature.

5. The method as claimed in claim 1, wherein:
at least two first state values and/or at least two second state values are ascertained;
the first self-estimated value is a product of the respective two first state values; and
the second self-estimated value is ascertained a product of the respective two second state values.

6. The method as claimed in claim 1, wherein the power system component transmits its class and its maximum power to the central control unit.

7. The method as claimed in claim 6, wherein a system priority value of each power system component is ascertained as a function of a state value describing the class of the power system component.

8. The method as claimed in claim 7, wherein determining the system priority value includes using predetermined state value functions which provide state values according to a physical input variable, a cost-dependent input variable, and/or an emission-dependent input variable.

9. The method as claimed in claim 7, wherein the system priority value is incorporated into the distribution variable.

10. A power system comprising:
a central control unit; and
two power system components, each power system component having a respective control unit and connected to the central control unit;
wherein the central control unit is configured to:
determine a first self-estimated value of the first power system component in an associated control unit based on a first state value,
ascertain a second self-estimated value of the second power system component in an associated control unit based on a second state value;
provide the central control unit with a present maximum amount of power for each of the first power system component and the second power system component;
receive a request for a demanded electrical power in the central control unit;
ascertain in the central control unit a distribution variable relating to the demanded power for each power system component based on the respective self-estimated values and the respective maximum amount of power output,
wherein the distribution variable comprises a weighting variable as the quotient of the self-estimated value and the maximum power of a power system component in relation to the sum of all the self-estimated values and the respective maximum power thereof; and distribute a demanded electrical power to the power system components, wherein the power system components comprise an energy generator unit, an energy consumer unit, or an energy storage unit.

11. The power system as claimed in claim 10, wherein the central control unit is locally assigned to a node of a power grid.

12. The power system as claimed in claim 10, wherein the power system component comprises a virtual power plant or a power subsystem.

13. The power system as claimed in claim 10, wherein the power system component comprises a virtual battery.

* * * * *